United States Patent [19]

Oku et al.

[11] Patent Number: 5,106,905
[45] Date of Patent: Apr. 21, 1992

[54] COLORANTS, POLYESTER FIBERS MASS-COLORED THEREWITH AND PROCESS FOR SPINNING MASS-COLORED POLYESTER FIBERS

[75] Inventors: Shosuke Oku; Noboru Watanabe, both of Sabae; Tsuneo Ohkawara, Sakai; Fumio Hirota, Tokyo; Tsutomu Kado, Kawagoe, all of Japan

[73] Assignees: Nippon Ester Company, Ltd., Okazaki; Kanebo, Ltd.; Toyo Ink Mfg. Co., Ltd., both of Tokyo, all of Japan

[21] Appl. No.: 644,547

[22] Filed: Jan. 23, 1991

Related U.S. Application Data

[63] Continuation-in-part of Ser. No. 315,508, Feb. 24, 1989, abandoned, which is a continuation-in-part of Ser. No. 115,888, Nov. 2, 1987, abandoned.

[30] Foreign Application Priority Data

Nov. 5, 1986 [JP] Japan ............................. 61-264677
Nov. 8, 1986 [JP] Japan ............................. 61-266278
Oct. 27, 1987 [JP] Japan ............................. 62-271378

[51] Int. Cl.$^5$ .......................... C08J 3/20; C08K 5/15; C08L 67/02
[52] U.S. Cl. .................................. 524/604; 524/605
[58] Field of Search ........................ 524/604, 605

[56] References Cited

U.S. PATENT DOCUMENTS 4,879,335 11/1989 Hirota et al. .................. 524/605

FOREIGN PATENT DOCUMENTS 60-45690 3/1985 Japan .

Primary Examiner—Paul R. Michl
Assistant Examiner—U. K. Rajguru
Attorney, Agent, or Firm—Flynn, Thiel, Boutell & Tanis

[57] ABSTRACT

A heat resistant colorant for mass-coloring polyester such as polyethylene terephthalate, containing 100 parts of pigments and/or dyes and 42~2,000 parts of a liquid aliphatic polyester dispersing medium having a viscosity at 25° C. not exceeding 150 poises and a hydroxyl value not exceeding 25 mgKOH/g. The dispersing medium contains a polycondensate of alkylene glycols including at least 30% by weight of 1,3-butanediol with at least one aliphatic dicarboxylic acid, which polycondensate has at least one terminal group blocked with a monohydric alcohol. The colorants are easily blended and uniformly dispersed in a fiber grade polyester, without causing degradation of the polyester. Fibers mass-colored by the colorant are excellent in stability during their manufacture and uniform in quality.

14 Claims, No Drawings

COLORANTS, POLYESTER FIBERS MASS-COLORED THEREWITH AND PROCESS FOR SPINNING MASS-COLORED POLYESTER FIBERS

CROSS-REFERENCE TO RELATED APPLICATION

This application is a continuation-in-part of copending application, Ser. No. 315,508 filed Feb. 24, 1989, now abandoned, which in turn is a continuation-in-part of patent application, Ser. No. 115,888 filed Nov. 2, 1987, now abandoned.

BACKGROUND OF THE INVENTION

1. Field of the Invention

The present invention relates to colorants for mass-coloring polyesters, particularly, colorants to be incorporated into polyesters during spinning polyester fibers. This invention also relates to polyester fibers mass-colored with the above colorants and a process for spinning the same, particularly, a mass-coloring and spinning process of polyester fibers.

2. Related Art Statement

Aromatic polyesters represented by polyethylene terephthalate have been extensively used for manufacturing shaped articles, such as fibers, films, plastics, etc., by virtue of their excellent heat and weather resistances. As one of the processes for coloring these aromatic polyesters, there has been a process wherein pigments and/or dyes are mixed and dispersed therein, namely, a mass-coloration process, on which various studies have so far been made.

It has been known that pigments such as carbon black are incorporated into the reaction system. However, only inorganic pigments that are good in heat resistance, such as titanium dioxide, carbon black and the like, have been employable. Alternatively, a so-called color concentrate process is, since pigments are dispersed in the polymer at high temperatures, not only involved in a problem of dispersibility but also comprises complicated steps. Moreover, it has a drawback such that the polymer is degraded at high temperatures in the step of obtaining master chips as well as in the step of mixing them with other chips.

As a so-called "colorant for dope-dyeing" of synthetic fibers, there have been known those having pigments dispersed in a dispersing medium such as ethylene glycol and the like with the aid of a dispersing agent such as an amino alcohol and the like, but they are not satisfactory and also do not resolve problems in practical applications.

Japanese Patent Application Laid-open No. 58-149,311 discloses a colorant comprising a pigment dispersed in an ester of a mono- or polybasic organic acid as an acidic component and a mono- or polyhydric alcohol as an alcoholic component. Further, Japanese Patent Application Laid-open No. 60-45,689 discloses a liquid colorant for mass-coloring polyester fibers, comprising a liquid polyester and a pigment admixed therewith, and Japanese Patent Application Laid-open No. 60-45,690 discloses a colorant wherein a pigment is incorporated into a liquid polyester having an acid value of about 1.0 and a viscosity of about 10 poises, obtained from adipic acid, ethylene glycol and 2-ethylhexyl alcohol, as starting materials. In the case where the colorants are mixed and dispersed in polyesters, particularly, the aromatic polyesters represented by polyethylene terephthalate, the heat stability of the polyesters is lowered so that problems, such as difficulties in manufacture as well as discoloration caused by heat during melt-spinning, still remain unsolved. Also in the case where there are employed the colorants comprising, as a dispersing medium, a liquid aliphatic polyester obtained by reacting adipic acid with ethylene glycol, etc., the liquid aliphatic polyester lowers the inherent viscosity of the polyester to be colored so that not only, for example, filament breakages occur more frequently, causing impairment of the spinnability, but also filament qualities such as tenacity, elongation or the like are deteriorated. Further, the liquid polyester wherein 2-ethylhexyl alcohol is used as a part of the starting materials is not satisfactory in respect of heat resistance and, therefore, presents problems such that generation of decomposed gases, discoloration, deterioration of physical properties, etc. are brought about on the mass-colored polyesters, during spinning of the polyesters.

SUMMARY OF THE INVENTION

As a result of researches conducted to obtain colorants for mass-coloring polyesters which do not have the above drawbacks, we, the inventors, have accomplished the present invention.

An object of the present invention is to provide colorants for mass-coloring polyester fibers.

Another object of the invention lies in the colorants having an excellent stability during the manufacture, preventing the deterioration of the physical properties of the fibers.

Yet another object is to provide colorants that are feasible for use.

A still further object is to provide mass-colored polyester fibers which are uniform in color and excellent in physical properties such as tenacity, elongation, and heat and weather resistances.

The above objects of the invention are achieved by a heat resistant colorant for mass-coloring polyester fibers, which comprises 100 parts by weight of a pigment and/or dye and 42 to 2,000 parts by weight of a liquid polyester dispersing medium having a molecular weight of at least 1,500, a viscosity at 25° C. not exceeding 150 poises and a hydroxyl value not exceeding 25 mgKOH/g, said liquid polyester dispersing medium comprising a polycondensate of at least one aliphatic dicarboxylic acid with at least one alkylene glycol or polyalkylene glycol, having at least one terminal group blocked with a monohydric alcohol, said alkylene glycol or polyalkylene glycol comprising 30 to 100% by weight of 1,3-butanediol and 70 to 0% by weight of at least one alkylene glycol selected from the group consisting of ethylene glycol, propylene glycol, butylene glycol, pentylene glycol and hexylene glycol.

Further, a mass-coloring and spinning process of polyester fibers according to the present invention comprises compounding 100 parts of a fiber-forming polyester resin with at least 2.5 parts of the above liquid colorant, by weight, and at most an amount necessary and sufficient to provide a total hydroxyl value not exceeding 8 mgKOH/g to a resulting polyester resin compound to be spun, and then melt-spinning the resulting polyester resin compound.

DETAILED DESCRIPTION OF THE EMBODIMENTS

The pigments and dyes to be applied to the present invention are not particularly specified but may be any of those generally being used, i.e., mention may be made of, for example, organic pigments such as azo series, phthalocyanine series, perinone series, anthraquinone series and the like; inorganic pigments such as carbon black, ultramarine, titanium dioxide and the like; and dyes such as azo series, perinone series, anthraquinone series and the like. In the colorants according to the present invention, use of pigments alone or in combination with dyes is preferred.

The liquid polyester dispersing media to be applied to the present invention necessarily comprise a polyester of at least one aliphatic dicarboxylic acid, such as adipic acid, sebacic acid, azelaic acid, glutaric acid and the like, with at least one alkylene glycol or polyalkylene glycol. The glycolic or polyglycolic components of the above polyester comprise 1,3-butanediol in an amount of at least 30%, preferably at least 50%, by weight, based on the total glycolic components. Other glycolic or polyglycolic components include, for example, ethylene glycol, propylene glycol, butylene glycol, pentylene glycol, hexylene glycol, diethylene glycol or the like, or a polyglycol, such as polyethylene glycol, polypropylene glycol, polybutylene glycol or the like. As the glycolic component, aliphatic glycols having 2~6 carbon atoms, particularly ethylene glycol and propylene glycol, are usually employed together with 1,3-butanediol. If the amount of 1,3-butanediol is less than 30% by weight, the melting point of the polyester will become above 0° C. which is not preferred as a liquid colorant. It is possible to obtain a liquid polyester having a melting point of not higher than 0° C. by using other glycolic components, for example, propylene glycol. However, an excessive use of such a glycolic component will lower the spinnability.

As the acidic component of the polyester, aliphatic dicarboxylic acids having 3~8 carbon atoms are usually employed. As the acidic component, adipic acid is most preferred.

The polyesters obtained from these aliphatic acids and glycols should have at least one terminal group blocked with a monohydric alcohol such as ethyl alcohol, propyl alcohol, butyl alcohol, amyl alcohol, hexyl alcohol, heptyl alcohol, octyl alcohol, iso-octyl alcohol, 2-ethyl-hexyl alcohol, nonyl alcohol, decyl alcohol, cetyl alcohol, oleyl alcohol, or the like. As such monohydric alcohols, propyl alcohol is most preferred.

The blocking by the monohydric alcohols of the terminal groups can be carried out either after the polymerization of the aliphatic polyesters or by admixing the monohydric alcohols in the reaction system and then effecting the polycondensation reaction. The admixing to the reaction system is more feasible.

The liquid polyester dispersing media comprising the above polyester have a hydroxyl value of 25 mgKOH/g or less, preferably 20 mgKOH/ or less, a molecular weight of at least 1,500, preferably 1,500~3,500, particularly preferably 1,500~2,500, and a viscosity at 25° C. of 150 poises or less, preferably 100 poises or less. The molecular weight herein represents a number-average molecular weight.

If the dispersing media have a hydroxyl value exceeding 25 mgKOH/g, the polyesters that are mixed dispersively with the colorants and then melt-spun will have their heat stability so lowered that troubles in manufacture, e.g., frequent occurrence of filament breakages as well as discoloration will be induced, or the heat and weather resistances of the fibers will be impaired, and so it should be avoided.

The above-described liquid polyester dispersing media may be used alone or in combination with liquid polyether dispersing media so far as the resulting compounded dispersing media have a viscosity at 25° C. not exceeding 150 poises and a hydroxyl value not exceeding 25 mgKOH/g.

An example of such a polyether is represented by the following general formula (I), $$R^1COO(R^3O)_n COR^2 \qquad (I)$$

wherein $R^1$ and $R^2$ are the same or different alkyl groups each having 2~17 carbon atoms, $R^3$ is an alkylene group having 2~4 carbon atoms and may comprise the same or different alkylene moieties, and n denotes an integer of 3~10. Both terminal acids may be the same or different acids selected from the group consisting of valeric acid, caproic acid, pelargonic acid, capric acid, enanthic acid, caprylic acid, undecanoic acid, lauric acid, tridecanoic acid, myristic acid, pentadecanoic acid, palmitic acid, margaric acid, stearic acid, hydrogenated ricinoleic acid, oleic acid, elaidic acid, erucic acid, ricinoleic acid and the like. Particularly, lauric acid and oleic acid are preferred.

Further, the polyalkylene glycols, i.e., a constituent of the polyether, include, for example, polyethylene glycol, polypropylene glycol, polytetramethylene glycol, and block or random copolymers thereof. Particularly, polyethylene glycol is preferred. The degree of polymerization (n) of the polyalkylene glycol is 3~10, preferably 5~8.

Accordingly, as the compound of the general formula (I), polyethylene glycol dilaurate and polyethylene glycol dioleate are particularly preferred.

Another example of the polyether is represented by the following general formula (II), $$R^4 O(R^3O)_n COR^2 \qquad (II)$$

wherein $R^2$ is an alkyl group having 2~17 carbon atoms, $R^3$ is an alkylene group having 2~4 carbon atoms and may comprise the same or different alkylene moieties, $R^4$ is an aromatic group substituted with alkyl group(s) having 2~18 carbon atoms, or an alkyl group, and n denotes an integer of 3~10. This polyether is composed of an ester of a monobasic fatty acid and an alkylene oxide adduct of a monohydric alcohol or alkyl phenol.

The monohydric alcohol is exemplified by ethanol, propanol, butanol, pentanol, hexanol, heptanol, octanol, iso-octanol, 2-ethyl-hexyl alcohol, nonyl alcohol, decyl alcohol, cetyl alcohol, oleyl alcohol, benzyl alcohol or the like. Particularly, cetyl alcohol and oleyl alcohol are preferred.

As an alkyl phenol, mention may be made of, for example, 2-methyl-phenol, 3-methyl-phenol, 4-methyl-phenol, 2,3-dimethyl-phenol, 2,4-dimethyl-phenol, 2,6-dimethyl-phenol, 3,4-dimethyl-phenol, 3,5-dimethyl-phenol, 2-ethyl-phenol, 3-ethyl-phenol, 4-ethyl-phenol, 2-propyl-phenol, 3-propyl-phenol, 4-propyl-phenol, 2-tert-butyl-phenol, 3-tert-butyl-phenol, 4-tert-butyl-phenol, 2-sec-butyl-phenol, 4-sec-butyl-phenol, 2-n-butyl-phenol, 3-n-butyl-phenol, 4-n-butyl-phenol, 4- methyl-2-tert-butyl-phenol, 4-tert-amyl-phenol, 4-n-amyl-phenol, 4-methyl-2-tert-amyl-phenol, 2,5-dimethyl-4-tert-butyl-phenol, 4-ethyl-2-tert-butyl-phenol, 2,6-di-tert-butyl-phenol, 4-diisobutyl-phenol, 3-methyl-4,6-tert-butyl-phenol, 3-methyl-4-diiosbutyl-phenol, 2,3-dimethyl-4,6-di-tert-butyl-phenol, 3-ethyl-4,6-ditertbutyl phenol, 4-methyl-2,6-di-tert-amyl-phenol, 2,4,6-tri-tert-butyl-phenol, nonyl phenol, octyl phenol and the like. Particularly, nonyl phenol and octyl phenol are preferred.

The alkylene oxide polymers to be added to the above, include homopolymers of ethylene oxide, propylene oxide, butylene oxide or the like, and random or block copolymers of a plurality of the alkylene oxides. Particularly, an ethylene oxide homopolymer is preferred. Further, the n is an integer of 3~10, preferably 5~8.

The fatty acids to be employed for the esterification include the same or different acids selected from the group consisting of valeric acid, caproic acid, pelargonic acid, capric acid, enanthic acid, caprylic acid, undecanoic acid, lauric acid, tridecanoic acid, myristic acid, pentadecanoic acid, palmitic acid, margaric acid, stearic acid, hydrogenerated ricinoleic acid, oleic acid, elaidic acid, erucic acid, ricinoleic acid and the like. Particularly, lauric acid and oleic acid are preferred.

Accordingly, as the compound of the general formula (II), polyoxyethylene cetylether laurate, polyoxyethylene oleylether oleate, polyoxyethylene nonylphenylether oleate are particularly preferred. A further example of the liquid polyether dispersing media to be used with the aforementioned liquid polyester dispersing media is a bisphenol A derivative represented by the following general formula (III)

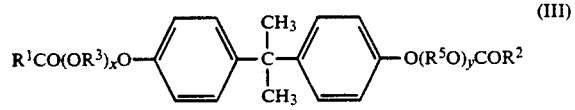

wherein $R^1$ and $R^2$ are the same or different alkyl groups each having 2~17 carbon atoms, $R^3$ and $R^5$ are the same or different alkylene groups each having 2~4 carbon atoms, x and y denote integers of at least 0 respectively and the sum of x and y does not exceed 50. The above bisphenol A derivative is a fatty acid diester of an alkylene oxide adduct of bisphenol A. The alkylene oxides to be added include ethylene oxide, propylene oxide, butylene oxide and the like. Either homopolymers or random or block copolymers of a plurality of the alkylene oxides can be used. However, an ethylene oxide homopolymer is particularly preferred.

The x and y are integers of at least 0, respectively, and the sum of x and y does not exceed 50. If the sum of x and y exceeds 50, the viscosity of the liquid dispersing medium becomes too high, and so it is not preferred. Further, x plus y is preferred to be 2~10.

The fatty acids to be employed for the esterification include the same or different acids selected from the group consisting of valeric acid, caproic acid, pelargonic acid, capric acid, enanthic acid, caprylic acid, undecanoic acid, lauric acid, tridecanoic acid, myristic acid, pentadecanoic acid, palmitic acid, margaric acid, stearic acid, hydrogenated ricinoleic acid, oleic acid, elaidic acid, erucic acid, ricinoleic acid and the like. Particularly, lauric acid and oleic acid are preferred.

Accordingly, as the compound of the general formula (III), lauric acid ester and oleic acid ester, of an ethylene oxide adduct of bisphenol A are particularly preferred.

A still further example employable with the liquid polyester dispersing media is a polyether-ester represented by the following general formula (IV),

wherein $R^6$ and $R^7$ are the same or different alkylene groups, $R^8$ is an alkylene or phenylene group and may comprise the same or different moieties, l and m denote integers of 3~20 and p denotes an integer of 1~20. The above polyether-ester comprises a dicarboxylic acid and a polyether.

As the dicarboxylic acid, mention may be made of aromatic dicarboxylic acids such as terephthalic acid, isophthalic acid, naphthalene dicarboxylic acid, trimellitic acid, 5-sodium-sulfo-isophthalic acid and the like, and aliphatic dicarboxylic acids such as adipic acid, sebacic acid, glutaric acid and the like. Particularly, adipic acid and terephthalic acid are preferred.

Further, as the polyether, mention may be made of adducts of ethylene oxide, propylene oxide and butylene oxide. Either homopolymers or random or block copolymers of a plurality of the alkylene oxides can be used. However, an ethylene oxide homopolymer is particularly preferred.

The l and m are integers of 3~20, particularly preferably 5~15, respectively. Besides, the degree of polymerization (p) is preferably in the range between 1 and 20, and a particularly preferred range is between 3 and 15. Accordingly, as the compound of the general formula (IV), a polyester of adipic acid or terephthalic acid with polyoxyethylene is particularly preferred.

Alternatively, as the liquid dispersing media according to the invention, modified polyesters, wherein liquid polyesters having alcoholic groups at least on one end of their molecule are linked together by aliphatic diisocyanates, are applicable.

The liquid polyesters having alcoholic groups at least on one end of the molecule include polycondensates of an aliphatic dicarboxylic acid such as adipic acid, sebacic acid, azelaic acid, glutaric acid, hydrogenated phthalic acid and the like, with a glycol such as ethylene glycol, propylene glycol, butylene glycol, pentylene glycol, hexylene glycol, neopentylene glycol, diethylene glycol and the like. As the aliphatic dicarboxylic acid, it is preferred to have 3~8 carbon atoms, and particularly adipic acid is preferred. Further, as the glycolic component, it is preferred to have 2~6 carbon atoms, and particularly propylene glycol and butylene glycol are preferred.

In addition to the above dicarboxylic acids and glycols, there are also employable, as an acidic component, aromatic dicarboxylic acids or anhydrides thereof, such as terephthalic acid, isophthalic acid, phthalic acid, phthalic anhydride and the like; monobasic carboxylic acids, such as coconut oil fatty acids, soybean oil fatty acids, oleic acid, lauric acid and the like; polybasic carboxylic acids or anhydrides thereof, such as trimellitic acid, pyromellitic acid and the like; and as an alcoholic component, monohydric alcohols, such as n-octyl alcohol, isooctyl alcohol, 2-ethyl-hexyl alcohol, n-nonyl alcohol, n-decyl alcohol and the like; and polyhydric alcohols, such as trimethylol propane, glycerine, pentaerythritol, dipentaerythritol, sorbitol and the like. Further, the polyethers which are components of the general formula (IV) also can be used.

The liquid polyesters having alcoholic groups at least on one end of the molecule can be obtained by adding an excess of the alcoholic components to the acidic components. The number of moles of hydroxyl groups of the alcoholic component is preferably 1.1~2 moles, more preferably 1.2~1.5 moles, per 1 mole of the carboxylic groups of the acidic component.

As the diisocyanates to link the liquid polyesters together, mention may be made of aromatic diisocyanates and alicyclic diisocyanates, such as 2,4-tolylene diisocyanate, 2,6-tolylene diisocyanate, diphenylmethane-4,4'-diisocyanate, polymethylene polyphenyl diisocyanate, diphenylether-4,4'-diisocyanate, 3,3'-dimethyl-diphenylmethane-4,4'-diisocyanate and the like; and aliphatic diisocyanates, such as lysine diisocyanate, hexamethylene diisocyanate and the like. From the viewpoints of color shades and weather durabilities, the aliphatic diisocyanates, particularly, hexamethylene diisocyanate, is preferred.

In the case where the liquid polyesters having alcoholic groups on at least one end of the molecule are linked by an aliphatic diisocyanate, the linking is effected with a mole ratio of the diisocyanate to the liquid polyester of 0.1~0.7, preferably 0.2~0.4.

The resultant modified polyesters have a hydroxyl value of preferably 25 mgKOH/g or less, particularly preferably 20 mgKOH/g or less.

If the molecular weight of the above described liquid dispersing media is less than 700, the heat resistance will be lowered and gas generation during blending as well as thermal decomposition of the polyester will occur. Furthermore, if, when pigments or dyes are blended or admixed, the viscosity at 25° C. of the liquid dispersing medium exceeds 150 poises, the pigment or dye content will become as low as 20% or less so that an effective, deeply dyed article can not be obtained.

The liquid dispersing media to be applied to the present invention are used in an amount of 42~2,000 parts, preferably 100~1,500 parts per 100 parts of pigments and/or dyes, by weight. If the above amount of the dispersing media is less than 42 parts by weight, the pigments, etc. are hardly dispersed with uniformity and, besides, the colorants obtained therefrom come to have such a high viscosity that they are difficult to deal with. If it exceeds 2,000 parts by weight, the viscosity of the obtained colorants is so lowered that the pigments, etc. deposit with the lapse of time and, moreover, in the case of the manufacture of fibers, the spinnability of the mass-colored polymer is so lowered that a uniform yarn quality is hardly obtainable.

Though it differs depending on the kind of pigments and/or dyes to be applied to the invention, there may be the case where the pigments and/or dyes tend to deposit within relatively a short period of time when the concentration of the pigments and/or dyes in the colorants is too low or the viscosity of the dispersing media is too low, that is, the obtained colorants have a too low viscosity, in particular, of 200 poises or less. For polyester fibers, since the spinning temperature is usually as high as 270° C. or more, the coloring materials comprising, as a main constituent, an inorganic pigment having a high heat resistance are preferably employed, whereas the above-mentioned tendency to deposition of the inorganic pigments is noticeably high. This tendency is sometimes observed even when organic dyes or pigments are used. In order to prevent the above tendency, without changing the concentration in the colorant of the dyes or pigments, in other words, without changing the amount of the colorants to be added to the polyester or the concentration of the dyes or pigments in the polyester fibers, inorganic fillers, if required, can be added in an amount of 1,400 parts or less per 100 parts of pigments and/or dyes, by weight.

As an inorganic filler applicable to the present invention, those generally being used for the purpose of improvement in the physical properties of plastics or of extension to reduce the cost of a product, can also be used, such as, for example, silica, barium sulphate, calcium carbonate, talc, kaolin, clay, diatomaceous earth and the like. Amongst the above, those having an average particle diameter of 5 $\mu$m or less are preferred from the viewpoint of dispersion stabilities, while those having no water of crystallization eluting at low temperatures are preferred for restraining the decomposition, etc. of the polyester to be colored.

If the inorganic fillers are added in an amount exceeding 1,400 parts per 100 parts of the pigments and/or dyes, by weight, the obtained colorants so increase in viscosity that they become difficult to deal with. However, since the inorganic fillers are generally less expensive than the dispersing media or dyes and/or pigments, the production cost of the colorants can be reduced by increasing the amount of the inorganic fillers added.

The colorants for mass-coloring polyesters of the present invention can be manufactured by uniformly blending the components according to any conventional processes, e.g., using a dispersing or kneading machine such as kneader, ball mill, sand mill, triple roll mill and the like. Needless to say, these may be used in combination. Further, the colorants for mass-coloring polyesters of the present invention may be used, if required, appropriately in combination with usual fluorescent whiteners, delustrants, brighteners, antistatic additives, heat- and light-stabilizers, etc.

The colorants according to the present invention can be blended in polyesters by usual processes, for example, blending by using a static mixer, etc., in a molten polyester prior to the spinning thereof.

In the case where polyester fibers are mass-colored with the colorants of the invention, 100 parts by weight of a fiber grade polyester are blended and colored with 0.5~12 parts, preferably 1~8 parts, by weight of the colorant of the present invention.

Particularly in the mass-coloration of polyester fibers, it is usually required to increase the pigment and/or dye content in the fibers for exhibiting a deep color shade. In the present invention, the use of colorants comprising a liquid polyester as a dispersing medium allows polyesters to be colored in a deep shade. Namely, the colorant according to the present invention comprising a liquid polyester dispersing medium is compounded with a fiber-forming polyester, in an amount of at least 2.5 parts per 100 parts of said fiber-forming polyester, by weight, and at most to provide a total hydroxyl value not exceeding 8 mgKOH/g to a resulting polyester resin compound to be spun. If the amount of the compounded colorant is less than 2.5 parts by weight, the coloring power will become too small to obtain polyester fibers having a deep color shade. By correlatively increasing the ratio of the pigment and/or dye occupying the liquid colorant, even a small quantity, for example, less than 2.5 parts by weight, of the colorant may be able to deeply color according to calculation. However, as the ratio of the pigment and/or dye occupying the liquid colorant increases, the viscosity of the liquid colorant also increases to cause an unstable measurement. Consequently, uniformly colored fibers cannot be obtained with stability. Further, if the colorant comprising a liquid polyester dispersing medium is compounded with a fiber-forming polyester in an amount to provide a total hydroxyl value exceeding 8 mgKOH/g to the resulting polyester compound, filament breakages become apt to occur during melt-spinning.

As the polyesters of fiber grade, aromatic polyesters such as polyethylene terephthalate, polybutylene terephthalate and the like, and copolyesters comprising at least 70 mol % of structural units such as ethylene terephthalate unit, butylene terephthalate unit and the like, are preferably used.

The invention is illustrated in more detail in the following examples. All parts and percents given below are by weight.

EXAMPLE 1

Seventy parts of a liquid polyester (hydroxyl value: 16 mgKOH/g; viscosity at 25° C.: 4,200 cps) obtained from 160 parts of adipic acid, 35 parts of 1,3-butanediol, 65 parts of pentylene glycol and 39 parts of amyl alcohol were kneaded with 30 parts of an anthraquinone pigment (trade name: FILESTER YELLOW RN, manufactured by Ciba Geigy) in a triple roll mill and a liquid colorant having a viscosity of 56,000 cps was obtained.

One hundred parts of polyethylene terephthalate (intrinsic viscosity [η]=0.63) were admixed with 1.25 parts and 6.0 parts, respectively, of the above colorant and then spun into a multifilament yarn composed of 8 denier individual filaments with a spinning machine, followed by drawing at 80° C. four times its original length. Thus a multifilament yarn composed of 2 denier individual filaments was obtained.

In Table 1, there are shown frequencies of breakage during spinning and of winding around the takeup roll, of individual filaments as well as variation of the fineness and intrinsic viscosities, of the obtained filament yarns.

COMPARATIVE EXAMPLE 1

Seventy parts of a liquid polyester (hydroxyl value: 12 mgKOH/g; viscosity at 25° C.: 6,600 cps) obtained from 223 parts of adipic acid, 81 parts of propylene glycol, 20 parts of ethylene glycol and 54 parts of amyl alcohol were kneaded with 30 parts of the pigment used in Example 1 in a triple roll mill and a liquid colorant having a viscosity of 72,000 cps was obtained. Spinning was conducted using the above liquid colorant. The results are shown in Table 1.

As is apparent from Table 1, the filament yarn obtained in the Comparative Example was of poor quality and high in CV value of fineness as compared with that of Example 1. Furthermore, the frequencies of filament breakage during spinning and filament winding during drawing were high as compared with Example 1.

TABLE 1

|  | Example 1 | | Comparative Example | |
|---|---|---|---|---|
| Amount of colorant added (%) | 1.25 | 6.0 | 1.25 | 6.0 |
| Spinning: | | | | |
| filament breakage (f/hr) | Nil | 0.014 | Nil | 0.097 |
| filament winding (f/hr) | Nil | Nil | Nil | 0.042 |
| Drawing: | Nil | Nil | 0.06 | 0.22 |

TABLE 1-continued

|  | Example 1 | | Comparative Example | |
|---|---|---|---|---|
| Amount of colorant added (%) | 1.25 | 6.0 | 1.25 | 6.0 |
| filament winding (f/hr) | | | | |
| Filament yarn | | | | |
| CV value of fineness (%) | 3.2 | 3.5 | 5.7 | 7.7 |
| Intrinsic viscosity [η] | 0.59 | 0.54 | 0.57 | 0.52 |

EXAMPLE 2

Eighty-five parts of a liquid polyester (hydroxyl value: 10 mgKOH/g; viscosity at 25° C.: 3,400 cps) obtained from 220 parts of adipic acid, 60 parts of 1,3-butanediol, 40 parts of propylene glycol and 50 parts of amyl alcohol were kneaded with 15 parts of a phthalocyanine blue (trade name: LIONOL BLUE, manufactured by Toyo Ink Mfg.) in a triple roll mill and a liquid colorant having a viscosity of 48,000 cps was obtained.

Using the above liquid colorant, a spinning test was conducted under the same conditions as Example 1. The results are shown in Table 2. As is apparent from Table 2, the obtained filament yarn was of good quality, without filament breakages, etc., occurring.

EXAMPLE 3

Eighty-eight parts of a liquid polyester (hydroxyl value: 12 mgKOH/g; viscosity at 25° C.: 5,400 cps) obtained from 200 parts of adipic acid, 84 parts of 1,3-butanediol, 16 parts of ethylene glycol and 39 parts of butyl alcohol were kneaded with 12 parts of carbon black (trade name: Mitsubishi Carbon #33, manufactured by Mitsubishi Kasei Corporation) in a triple roll mill and a liquid colorant having a viscosity of 77,000 cps was obtained.

Using the above liquid colorant, a spinning test was conducted with the same conditions as Example 1. The results are shown in Table 2. As is apparent from Table 2, the obtained filament yarn was of good quality, without filament breakages, etc., occurring.

TABLE 2

|  | Example 2 | Example 3 |
|---|---|---|
| Amount of colorant added (%) | 6.0 | 6.0 |
| Spinning: | | |
| filament breakage (f/hr) | 0.010 | 0.022 |
| filament winding (f/hr) | Nil | Nil |
| Drawing: | Nil | Nil |
| filament winding (f/hr) | | |
| Filament yarn: | | |
| CV value of fineness (%) | 3.7 | 4.2 |
| Intrinsic viscosity [η] | 0.55 | 0.54 |

As explained above and demonstrated by way of examples, the colorant for mass-coloring polyesters according to the present invention can be readily blended to polyesters before or during the formation of fibers, without separation or deposition, and, further, can produce polyester fibers having highly uniform qualities, with a stabilized operability in the manufacture, preventing degradation of the polyesters.

Furthermore, in the colorants for mass-coloring polyesters according to the invention, when the colorants are too low in viscosity, the tendency to deposit with the lapse of time of the pigments in the colorants can be prevented, if required, by further adding inorganic fillers, without changing the concentration in the colorants of the dyes or pigments, in other words, without changing the amount of the colorants to be added to the fibers or the concentration in the polyester fibers of the dyes or pigments. Besides, since the inorganic fillers are generally less expensive than the dispersing media or dyes and/or pigments, the production cost of the colorants can be lowered by increasing the amount of the inorganic fillers to be added.

What is claimed is:

1. A heat resistant colorant for mass-coloring polyester fibers, which comprises 100 parts by weight of a pigment and/or dye and 42 to 2,000 parts by weight of a liquid polyester dispersing medium having a molecular weight of at least 1,500, a viscosity at 25° C. not exceeding 150 poises and a hydroxyl value not exceeding 25 mgKOH/g, said liquid polyester dispersing medium comprising a polycondensate of at least one aliphatic dicarboxylic acid with at least one alkylene glycol or polyalkylene glycol, having at least one terminal group blocked with a monohydric alcohol, said alkylene glycol or polyalkylene glycol comprising 30 to 100% by weight of 1,3-butanediol and 70 to 0% by weight of at least one alkylene glycol selected from the group consisting of ethylene glycol, propylene glycol, butylene glycol, pentylene glycol and hexylene glycol.

2. A colorant as claimed in claim 1, wherein said monohydric alcohol is selected from the group consisting of propyl alcohol, butyl alcohol and amyl alcohol.

3. A colorant as claimed in claim 1, wherein the amount of said liquid polyester dispersing medium is 100 to 1,500 parts per 100 parts of the pigment and/or dye, by weight.

4. A colorant as claimed in claim 1, wherein said hydroxyl value, of the liquid polyester dispersing medium is 20 mgKOH/g or less.

5. A mass-coloring and spinning process of polyester fibers, which comprises compounding a fiber-forming polyester resin with a liquid colorant comprising 100 parts by weight of a pigment and/or dye and 42 to 2,000 parts by weight of a liquid polyester dispersing medium having a molecular weight of at least 1,500, a viscosity at 25° C. not exceeding 150 poises and a hydroxyl value not exceeding 25 mgKOH/g, said liquid polyester dispersing medium comprising a polycondensate of at least one aliphatic dicarboxylic acid with at least one alkylene glycol or polyalkylene glycol, having at least one terminal group blocked with a monohydric alcohol, said alkylene glycol or polyalkylene glycol comprising 30 to 100% by weight of 1,3-butanediol and 70 to 0% by weight of at least one alkylene glycol selected from the group consisting of ethylene glycol, propylene glycol, butylene glycol, pentylene glycol and hexylene glycol, which liquid colorant is compounded in an amount of at least 2.5 parts per 100 parts of said fiber-forming polyester resin, by weight, and at most an amount necessary and sufficient to provide a total hydroxyl value not exceeding 8 mgKOH/g to a resulting polyester resin compound to be spun, and then melt-spinning the resulting polyester resin compound.

6. A process as claimed in claim 5, wherein said monohydric alcohol is at least one alcohol selected from the group consisting of propyl alcohol, butyl alcohol and amyl alcohol.

7. A process as claimed in claim 5, wherein the amount of said liquid polyester dispersing medium is 100 to 1,500 parts per 100 parts of the pigment and/or dye, by weight.

8. A process as claimed in claim 5, wherein said hydroxyl value of the liquid polyester dispersing medium is 20 mgKOH/g or less.

9. Polyester fibers produced according to a process as claimed in claim 5.

10. A colorant as claimed in claim 1, wherein said 1,3-butanediol comprises at least 50% by weight of said alkylene glycol or polyalkylene glycol.

11. A heat resistant colorant for mass-coloring polyester fibers, which comprises 100 parts by weight of a pigment and/or dye and 100 to 1,500 parts by weight of a liquid polyester dispersing medium having a molecular weight of at least 1,500, a viscosity at 25° C. not exceeding 150 poises and a hydroxyl value not exceeding 25 mgKOH/g, said liquid polyester dispersing medium comprising a polycondensate of at least one aliphatic dicarboxylic acid with at least one alkylene glycol or polyalkylene glycol, having at least one terminal group blocked with a monohydric alcohol, said alkylene glycol or polyalkylene glycol comprising 50 to 100% by weight of 1,3-butanediol and 50 to 0% by weight of at least one alkylene glycol selected from the group consisting of ethylene glycol, propylene glycol, butylene glycol, pentylene glycol and hexylene glycol.

12. A colorant as claimed in claim 11, wherein said monohydric alcohol is selected from the group consisting of propyl alcohol, butyl alcohol and amyl alcohol.

13. A colorant as claimed in claim 11, wherein said hydroxyl value of the liquid polyester dispersing medium is 20 mgKOH/g or less.

14. A process as claimed in claim 5, wherein said 1,3-butanediol comprises at least 50% by weight of said alkylene glycol or polyalkylene glycol.

* * * * *